United States Patent Office 3,397,972
Patented Aug. 20, 1968

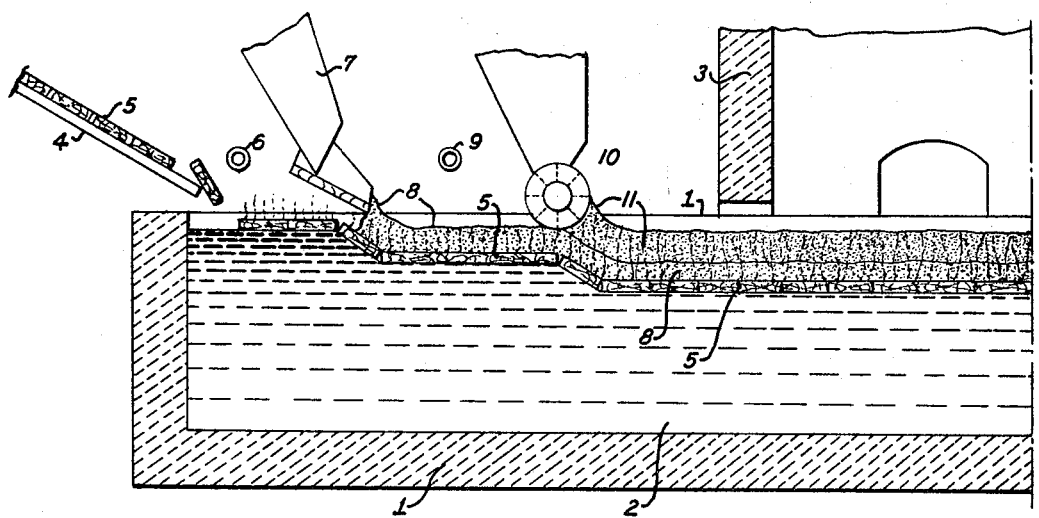

3,397,972
GLASS BATCH MELTING PROCESS
Edgard Brichard, 155 Chausee de Gilly, Jumet, Belgium, and André Malicheff, 53 Chausee de Zeebrugge, Lissewege, Belgium
Continuation-in-part of application Ser. No. 15,065, Mar. 15, 1960. This application Nov. 23, 1965, Ser. No. 509,417
Claims priority, application Belgium Mar. 28, 1959
10 Claims. (Cl. 65—27)

ABSTRACT OF THE DISCLOSURE

This process comprises the steps of depositing a layer of gas producing material over the glass bath, depositing a glass batch layer over the gas producing material, and then raising the temperatures of the layers to cause simultaneously the fusion of the glass batch and the production of gas from the gas producing material.

---

This application is a continuation-in-part of our copending application, Ser. No. 15,065, filed Mar. 15, 1960, now abandoned.

The present invention relates to new and useful improvements for melting the batch mixture for the production of glass which obviates segregation of an unmelted layer on the surface of the bath as well as the absorption by the molten glass of unmelted particles originating from the batch and avoids the disadvantages resulting therefrom. In particular the invention enables to avoid the disadvantages which result from the necessity of using too small a proportion of cullet.

In tank glass furnaces, it is sometimes found that there is a layer of light heterogeneous glass floating on the surface of the molten glass bath. This layer scarcely mixes with the mass by reason of its low density and its high surface tension. On the other hand, it tends to collect and to travel towards the points of utilization of the molten glass, where it causes defects, such as striae, cords, ridges, waves and reams, in the final products.

The heterogeneous glass layer forms notably as a result of a selective melting effect when some of the basic elements of the batch employed in the production of the glass, which are readily fusible and endowed with low surface tension, have been liquified and incorporated in the already molten glass, while there remains to be melted a considerable quantity of silica for which none of the fluxes initially provided are then present. This phenomenon takes place especially at the end of the fusion or melting period.

For this purpose, in accordance with the invention, the melting of the batch and principally the final period of this melting operation is caused to be accompanied by an evolution of gas bubbles emanating from materials possessing the essential property of producing a considerable quantity of gas when they reach a temperature close to the temperature of the furnace or at which fusion of the batch occurs. These gas bubbles vigorously agitate the batch undergoing the melting and forming the glass, and they prevent the formation of a light siliceous glass layer.

The batch and the materials evolving the gases may be simultaneously introduced into the furnace. Thus, they can simply be mixed before the charging of the furnace.

However, it has been found that the batch melts first on the upper face of the heaps introduced into the furnace and that the materials evolving gases ultimately emerge on the surface, where the gases are liberated without having any effect within the body of the heaps and that, moreover, there are no gasifiable materials any longer in the critical final melting phase. For this reason it is advantageous to prepare for introduction into the furnace, heaps in which the materials evolving gases constitute the lower layer and the mass of batch constitutes the upper layer, and to place these heaps in the furnace so as to disturb as little as possible the arrangement of the layers.

In accordance with a preferred embodiment of the invention, a layer of cullet is first deposited on the molten glass batch, whereafter the materials capable of evolving a large volume of gas are disposed on the aforesaid layer, and the batch from which the glass is to be produced is finally distributed on the bed thus formed. The gas bubbles evolved at the beginning of the fusion process, travel under the batch which is in the process of melting and emerge at the edge thereof, at the point where the products of the melting run down. The latter are thus vigorously agitated at the instant when they join the glass bath.

However, it has been found that the greatest portion of the volume of gases mostly evolves but at the end of the melting period. In fact it has been observed that the temperature of the layer of gasifiable materials does not rise at an important rate during the greatest portion of the melting period, due to the insulating properties of the batch situated at the top and of the subjacent layer of cullet or of molten glass. The gases then evolve mainly when fusion of the last portion of the batch takes place and they stir the liquid resulting from this fusion at the moment that segregation of glass rich in silica is to be feared.

Moreover, in another embodiment the gas-forming material is placed directly upon the molten glass surface and the batch, with or without cullet, disposed as a blanket over the gas-forming material. Some composition may or may not be placed below, but there will always be composition above, the gas-forming material.

As materials evolving gases, there are preferably employed materials which are capable of producing at the melting temperature of the glass batch a large volume of gas which escapes in the form of large bubbles. These materials may be completely volatile and need not enter the constitution of the glass, or they may leave products of decomposition which participate in the constitution of the glass. These materials may be chemical products, such as potassium chloride or sodium chloride, or oxides, notably arsenious oxide in pulverulent or block form. Materials such as dry or water-steeped wood, or roots, bulbs or tubers containing a large quantity of water may also be employed. Water may also be employed, which is poured on to the layer of cullet or on the molten bath and in both cases is immediately covered with the glass batch.

Contrary to some provisions, it has been found that this water which rapidly comes into contact with the molten glass in both cases does not bring about any explosion and is not appreciably vaporized provided it is at once covered with the batch. The cooling, produced by the beginning of vaporization, causes solidification of a skin of glass on the glass nath and this skin considerably delays further heat exchange. The skin produces several advantages: in some way it forms a mass of cullet artificially created in the furnace from molten glass, thus affording the possibility of preventing the drawbacks encountered in the fusion if one is limited to the use of a small proportion of cullet with respect to the quantity of composition fed into the furnace.

The skin also has a favorable effect upon the coherence of the blanket formed by the layer of materials charged into the furnace, blanket which is to be pushed into the furnace in a suitably regulatable direction. Moreover, said skin also constitutes a barrier which stops the grains or stones of composition from going into the molten glass; as these few grains or stones do not find the appropriate reagents in the glass, they remain unfused therein and cause defects in the resulting glass.

Naturally, the invention is not limited to the embodiment described by way of the following examples, and modifications may be made thereto without departing from its scope. It will be obvious, of course, that the composition will be formed by the mixture of conventional materials, such as sand, soda ash, sodium sulfate, limestone, etc. that are well known in the glass-making industry and that the mixture may be in grains or agglomerated units of larger size. Generally a spread out layer of composition will be from 2–80 cm. of thickness where the particles are of small size or are agglomerated in lumps but the composition may be in conical heaps of 10–150 cm. diameter.

The cullet which is scraps of glass of any form and dimension, crushed or non-crushed, will generally be fed in layers or heaps of thickness up to 50 cm. and will constitute from 0–300% of the weight of the composition.

The gas-forming material, if in small particle form such as powder or grains, may be charged in layers or heaps from 0.5 mm. up to 20 cm. thickness and if in more coarse form, e.g. the vegetable materials, may be charged in layers or heaps up to 30 cm. of thickness. The water, in proportions of 0.3–10% by weight of the composition, may be spread (1) directly onto the molten glass surface, (2) on a layer of cullet already charged into the furnace or (3) on a first bottom layer of the composition.

The invention is illustrated by way of example in the accompanying drawing which shows the feeding of gas-forming material in the form of deal boards 5 by an inclined feeder 4 into the feeding end 1 of a tank furnace to form a layer on the molten glass bath 2. The cullet 8 is fed by a feeder 7 and may be fed onto the deal boards 5 as shown. A batch feeder 10 feeds the batch material 11 into the tank so as to entirely cover the layer of gas-forming material before it enters the inlet end 3 of the furnace firing chamber. Water feeders 6 and 9 may be provided to feed water over the glass bath in the manner previously stated.

EXAMPLE I

In an oil heated tank furnace there was placed a bed (50 kilos) of deal boards of 15 mm. thickness on the molten glass. Immediately thereafter and above the boards were charged 300 kilos of cullet of about 60 mm. thickness and thereover was then charged a 30 cm. of 1000 kilos of non-agglomerated composition comprising 59.5% sand, 15.2% soda ash, 2.3% sodium sulfate, 23% limestone. In several minutes there was complete fusion of the composition and cullets with the deal boards continuing to burn in the refining zone.

EXAMPLE II

In the same type furnace of Example I, a 2.5 cm. thickness of cullet (broken glass) of about 1,250 kilos was charged onto the molten glass over which was poured 150 liters of water from a ramp arranged immediately before the charging device and thereafter there was charged a 25 cm. thick blanket of 8000 kilos of non-agglomerated composition comprising 59.5% sand, 15.2% soda ash, 2.3% sodium sulfate, 23% limestone, etc., all of which took some minutes to be completely fused into the molten bath.

We claim:
1. A process for melting a mixture to form a glass batch in a tank furnace containing a molten glass bath so as to tend to eliminate the formation on such glass batch of a heterogeneous glass layer, comprising depositing as a layer over the molten glass bath material capable of producing above the glass bath a considerable quantity of gas when such material subsequently reaches a temperature at most equal to the temperature at which fusion of the glass batch occurs, and immediately following the depositing of said layer of gas-forming material, depositing thereover a glass batch layer so as to entirely cover the layer of said gas-forming material before it has been heated to its gas producing temperature, and then raising the temperatures of the two aforesaid layers to cause simultaneously above the body of the glass bath the fusion of the glass batch and the production of gas so that gas bubbles are produced in and vigorously agitate the melting batch material as it runs down to join the glass bath.

2. The process of claim 1 wherein cullet is mixed into said glass batch.

3. The process of claim 1 wherein a cullet layer is deposited over the molten glass bath just prior to the depositing of said glass batch layer so that the latter covers both said layers of gas-forming material and cullet prior to the heating of such material to said fusion temperature.

4. The process of claim 1 wherein said gas-forming material is protected from direct contact with the surface of said molten glass bath.

5. The process of claim 4 wherein a layer of glass batch is deposited on said molten glass bath underneath said gas-forming material.

6. The process of claim 1, wherein said gas-forming material is a gas-forming chloride selected from the group consisting of sodium and potassium chlorides.

7. The process of claim 1, wherein said gas-forming material is a gas-forming oxide selected from the group consisting of arsenious oxide.

8. The process of claim 1, wherein said gas-forming material is a vegetable material selected from the group consisting of roots, bulbs, tubers and wood, and water.

9. The process of claim 1, wherein a layer of cullet is deposited over the molten glass bath prior to the depositing of said glass batch layer so that the latter covers both said layers of gas-forming material and cullet prior to the time such gas-forming material is heated to said gas producing temperature, and wherein said gas-forming material is constituted of water poured into the tank furnace above the molten glass bath material to deposit such water over the latter.

10. Process for melting a mixture to form a glass batch in tank furnaces, characterized in that a layer of cullet is first deposited in a molten glass bath, whereafter materials capable of evolving a large volume of gas when heated to a temperature close to the temperature of the furnace are deposited on said cullet layer, and distributing the glass batch mixture over the layer of said gas evolving material, and heating said furnace to melt said mixture.

References Cited

UNITED STATES PATENTS

| 2,284,398 | 5/1942 | Kutchka | 65—27 |
| 2,975,555 | 3/1961 | Zellers et al. | 65—134 X |
| 3,208,841 | 9/1965 | Burch | 65—335 X |

FOREIGN PATENTS 13,277   2/1904   Norway.

DONALL H. SYLVESTER, *Primary Examiner.*

F. W. MIGA, *Assistant Examiner.*

UNITED STATES PATENT OFFICE
CERTIFICATE OF CORRECTION

Patent No. 3,397,972                                      August 20, 1968

Edgard Brichard et al.

It is certified that error appears in the above identified patent and that said Letters Patent are hereby corrected as shown below:

Column 3, line 65, "batch" should read -- bath --.

Signed and sealed this 17th day of March 1970.

(SEAL)
Attest:

Edward M. Fletcher, Jr.                      WILLIAM E. SCHUYLER, JR.
Attesting Officer                                   Commissioner of Patents